UNITED STATES PATENT OFFICE.

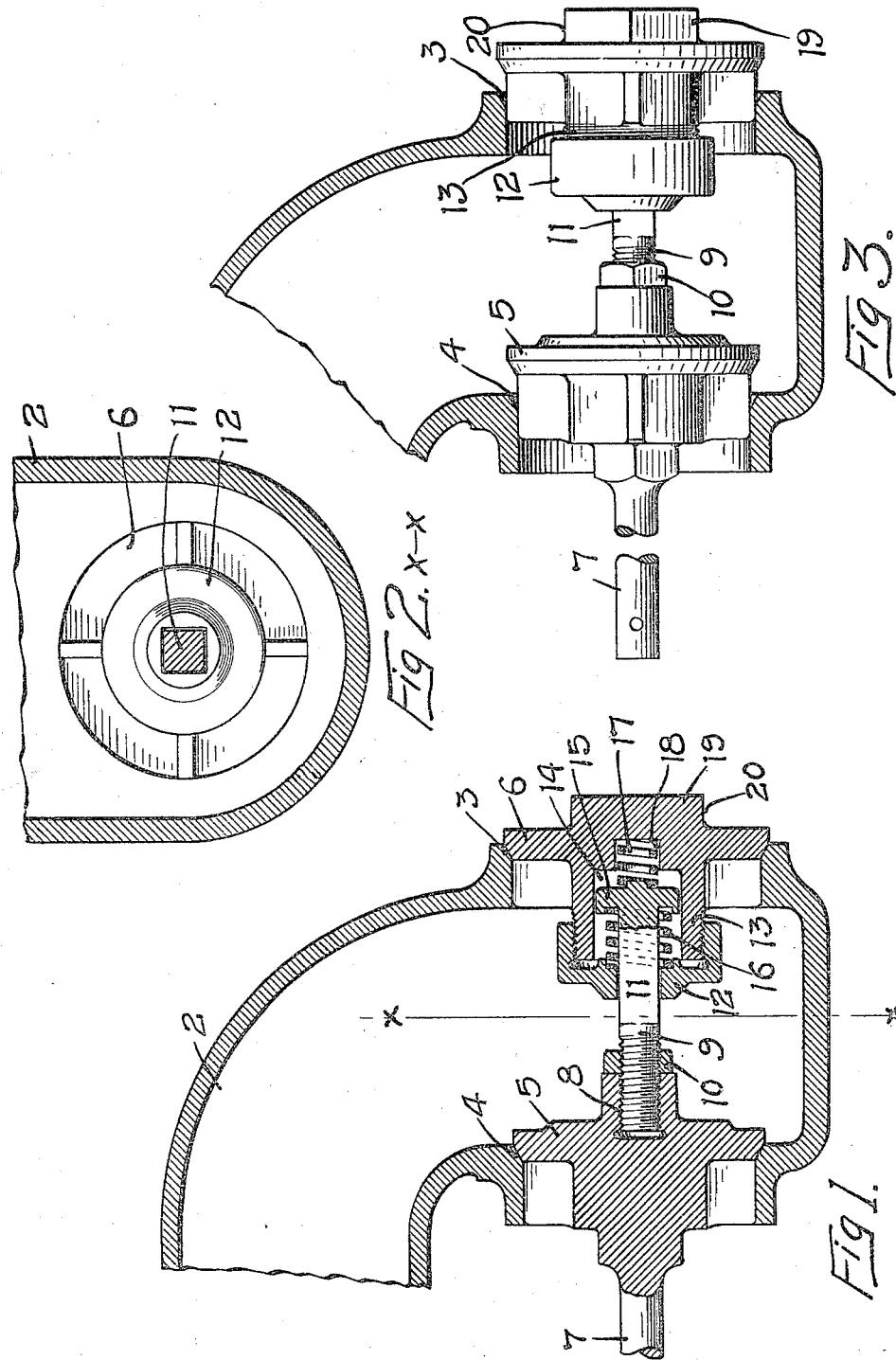

JOHN TONGE, OF MINNEAPOLIS, MINNESOTA, ASSIGNOR OF ONE-HALF TO JOHN I. DILLE, OF MINNEAPOLIS, MINNESOTA.

THROTTLE-VALVE.

960,735.           Specification of Letters Patent.      Patented June 7, 1910.

Application filed December 18, 1909. Serial No. 533,952.

*To all whom it may concern:*

Be it known that I, JOHN TONGE, of Minneapolis, Hennepin county, Minnesota, have invented certain new and useful Improvements in Throttle-Valves, of which the following is a specification.

My invention relates to valves and particularly to an adjustable balance valve for locomotive throttles, and the object of my invention is to provide means to insure the seating of a double valve thereby preventing leakage and the annoyance and danger resulting therefrom with a rigid connection between the valves.

It is very unsafe to leave an engine standing unless it is securely blocked, if equipped with the solid valve. With my invention the perfect seating of both valves is made possible and there is no danger of steam leakage.

My invention consists generally in a valve having two disks and a flexible connection between them.

Further the invention consists in various constructions and combinations, all as hereinafter described and particularly pointed out in the claims.

In the accompanying drawings forming a part of this specification, Figure 1 is a detailed sectional view illustrating the application of my invention to a double disk throttle valve, the valve being shown in section illustrating the connection between the disks. Fig. 2 is a sectional view on the line $x$—$x$ of Fig. 1. Fig. 3 is similar to Fig. 1 showing the valve in full lines.

In the drawing 2 represents a steam pipe having seats 3 and 4 formed thereon for valve disks 5 and 6, the former have an operating stem 7 to be connected with a lever mechanism (not shown), the disk 5 has an interiorly threaded socket 8 to receive the threaded end of a bolt 9 which is provided with a lock-nut 10. The bolt 9 is preferably square in cross section as at 11 where it passes through a cap 12 which fits the exteriorly threaded flange 13 provided on the inner face of the disk 6. This flange incloses a chamber 14 wherein a head 15 of the bolt 9 is movable, a coil spring 16 is preferably provided between the head 15 and the cap 12 and a second spring 17 preferably smaller than the spring 16 is interposed between the head of the bolt and the bottom of a socket 18 that is provided in the valve disk 6. These springs resist movement of the bolt in the chamber 14 and the tension of the springs may be regulated by the adjustment of the cap 12. The disk 6 has a projection or boss 19 thereon provided with faces 20 which are adapted to receive a wrench.

The rotation of the disk 6 will cause the adjustment of the cap 12 on the threaded flange and increase or decrease the tension of the springs as desired and this movement or adjustment with respect to the valve 6 may be performed independently of the disk 5 and the said disk 5 may be revolved to increase or decrease this distance from the disk 6 and the adjustment of the threaded end of the bolt in the socket 8. I am thus able to obtain the necessary adjustment of the disks to properly seat them from the outside of the steam pipe. The bolt fits loosely in the cap 12 allowing the disks to rock with respect to one another and seat themselves firmly on the seats 3 and 4, any danger of leakage around the valve disk is thus avoided and it is possible with this device to provide a locomotive throttle valve that is steam tight under all conditions and which may be easily and quickly adjusted to compensate for wear or expansion and contraction generally in devices of this kind where a rigid connection is provided between the disks, a valve may be tight when cold but will leak when the connection between the disks has become hot and expanded. In my invention, the yielding bearings for the bolt head in one of the disks will compensate for all expansion and contraction and keep the valve firmly seated at all times.

If for any reason while the engine is running the valve motion should be reversed by the engineer, the steam chest and cylinders will become air compressors, so to speak, and the pressure will increase in the cylinders above the pressure in the boiler. The larger the cylinders, the greater will be the increase in the back pressure and when the pressure becomes greater than the boiler pressure the valve 6 will rise from its seat allowing the excess pressure to enter the boiler. When the two pressures are equalized, the valve will return to its normal position.

I claim as my invention:—

1. The combination with a casing having valve seats, of disks fitting said seats, a bolt connected at one end to one of said disks and held against rotation, said other disk having a chamber to receive the opposite end of said bolt, the middle portion of said bolt being polygonal in cross section, a cap having threaded connection with the walls of said chamber and an opening to receive said polygonal portion of said bolt, means within said chamber yieldingly resisting longitudinal movement of said bolt and said chambered disk being capable of rotation to adjust said cap and regulate the tension of said yielding means.

2. The combination with a casing having valve seats, of disks therefor, a bolt having a threaded connection at one end with one of said disks and a head at its other end, said other disk having a chamber to receive said head, a cap having a threaded connection with the walls of said chamber and an opening to receive the middle portion of said bolt, springs provided in said chamber, one of them between the head of said bolt and said cap and the other between said bolt head and the bottom of said chamber and said bolt fitting loosely in said cap whereby a limited rocking movement of one valve disk with respect to the other is permitted.

3. A throttle valve comprising a casing having valve seats, disks for said seats, one of said disks having an operating stem, a bolt interposed between said disks and having a rigid connection with one of them and a sliding, oscillating connection with the other disk, said other disk having a threaded surface and a threaded cap therefor fitting said bolt and rotatable with said bolt but not independently thereof, said other disk having an outer surface adapted to receive a wrench, whereby said cap is rendered adjustable on said disk, and yielding means between said cap and disk.

In witness whereof, I have hereunto set my hand this 14th day of December 1909.

JOHN TONGE.

Witnesses:
L. C. CRONEN,
J. A. BYINGTON.